United States Patent [19]

Michna

[11] Patent Number: 4,842,086

[45] Date of Patent: Jun. 27, 1989

[54] ELECTROMAGNETIC LEVITATION DEVICE FOR WHEELED-VEHICLES

[76] Inventor: Claus G. Michna, 4 Toby La., Brookfield Center, Conn. 06804

[21] Appl. No.: 205,870

[22] Filed: Jun. 13, 1988

[51] Int. Cl.[4] .............................. B62D 55/00
[52] U.S. Cl. ........................ 180/9.1; 104/281; 305/39
[58] Field of Search ............. 180/9.1, 9.21; 305/39; 104/281

[56] References Cited

U.S. PATENT DOCUMENTS

| | | | |
|---|---|---|---|
| 3,261,418 | 7/1966 | Bertin | 180/9.1 |
| 3,331,461 | 7/1967 | Eggington | 180/9.1 |
| 3,512,602 | 5/1970 | Bertelsen | 180/9.1 |
| 3,960,090 | 6/1976 | Maki et al. | 104/281 |
| 3,960,229 | 6/1976 | Shio | 180/9.1 |
| 4,766,993 | 8/1988 | Kina et al. | 104/281 |

Primary Examiner—Kenneth R. Rice
Attorney, Agent, or Firm—Vincent A. Mallare

[57] ABSTRACT

This invention provides an electromagnetic device arranged to levitate and move a wheeled-vehicle over a waterless surface with a minimum energy expended. The electromagnetic device comprises: an endless belt which contacts the surface over which the vehicle is moved; a series of magnets positioned on the belt's inner surface which repel other series of magnets suspended from the vehicle body and axles; a set of wheels on the axles which engage a track positioned between the series of magnets on the inner surface of the belt; and a set of electric harnesses arranged to polarize the series of magnets, whereby they repel each other to transfer the wheeled-vehicle weight from the axles to the endless belt.

13 Claims, 7 Drawing Sheets

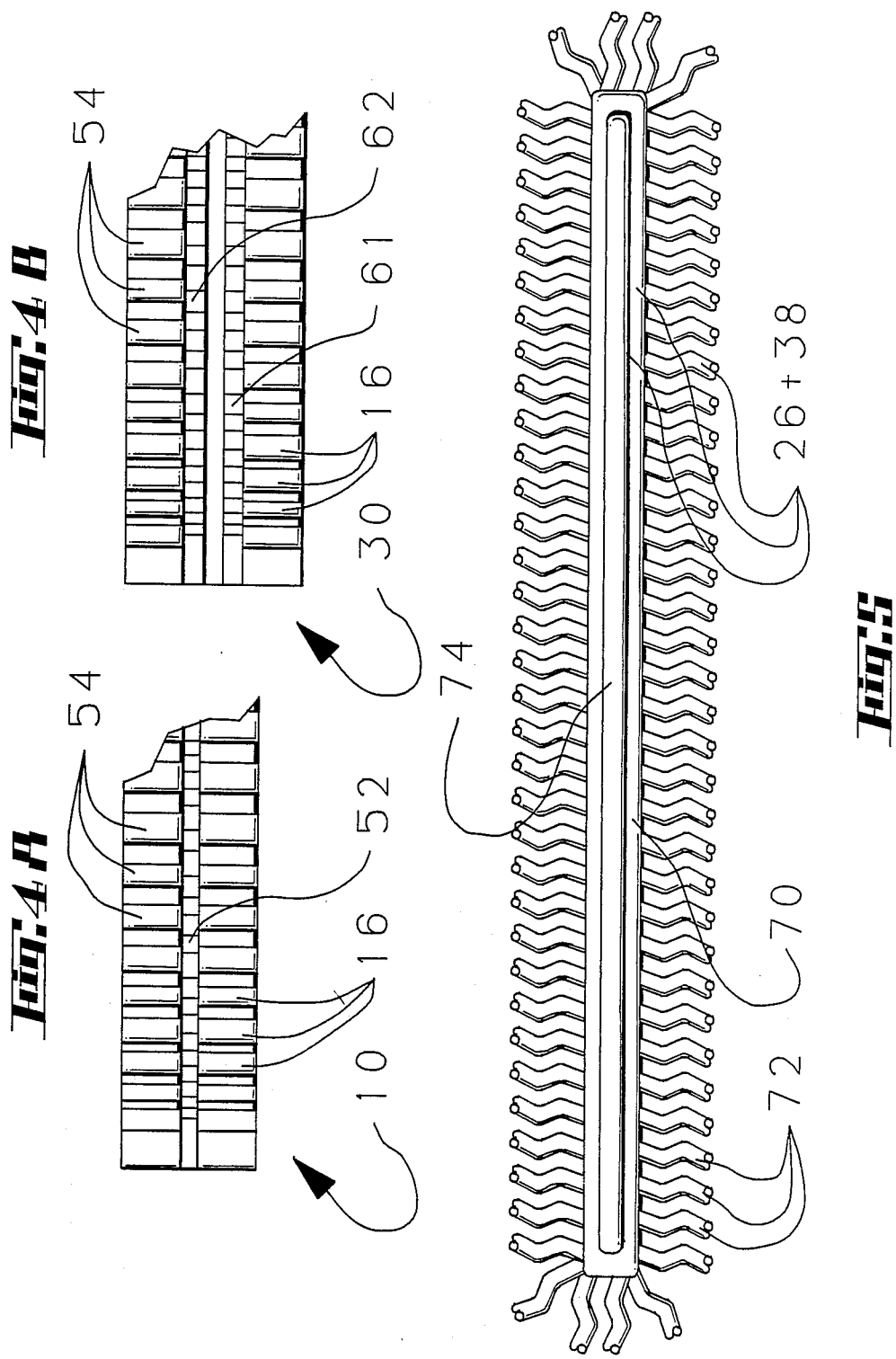

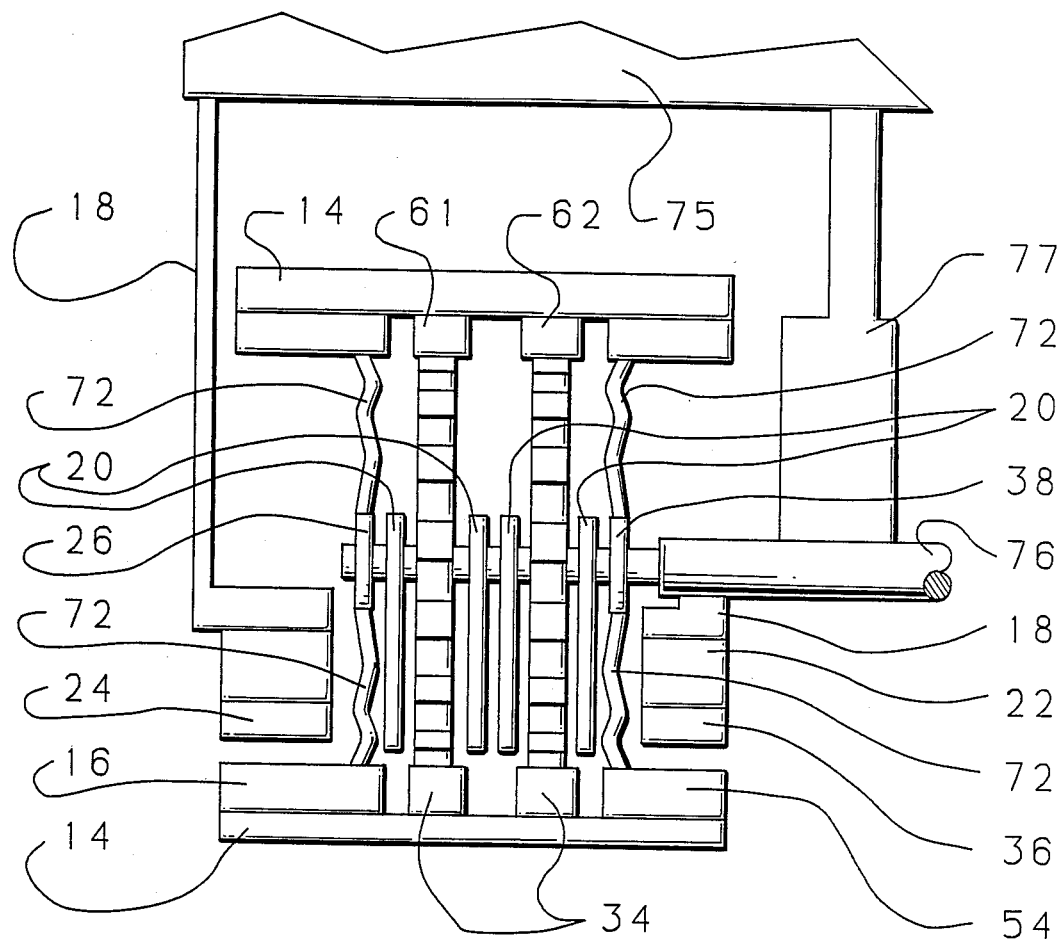

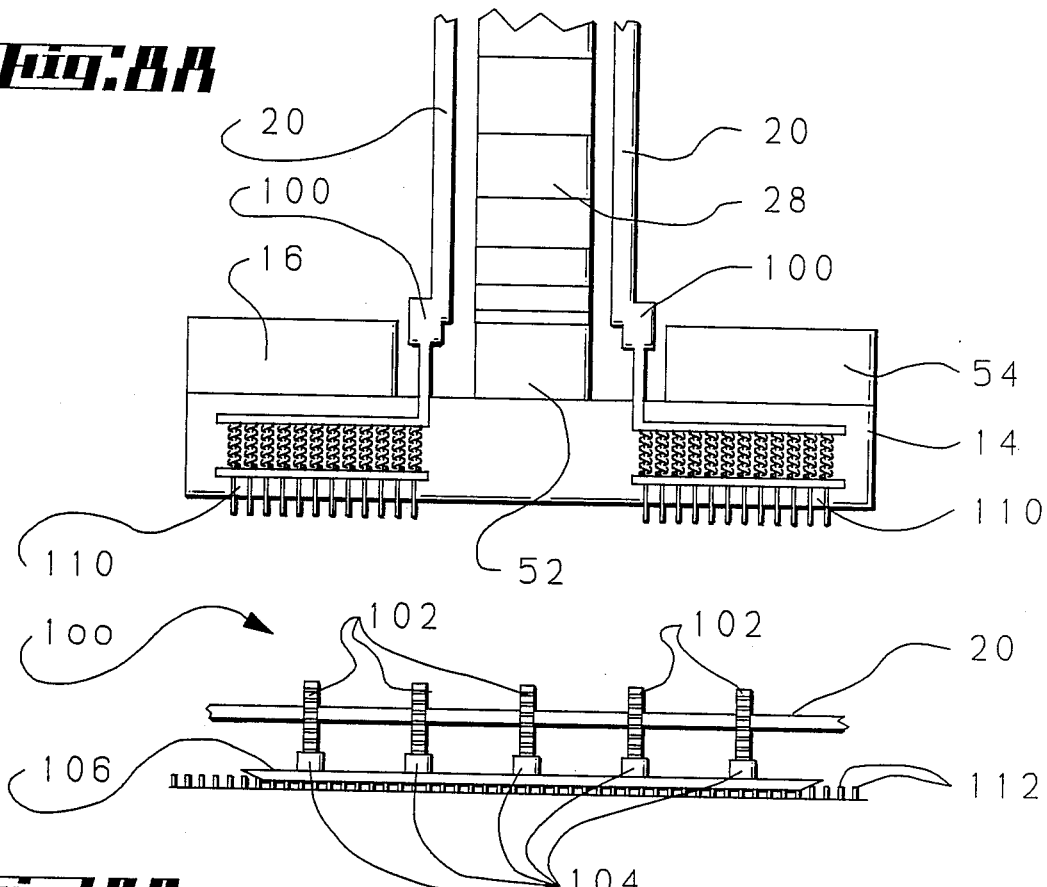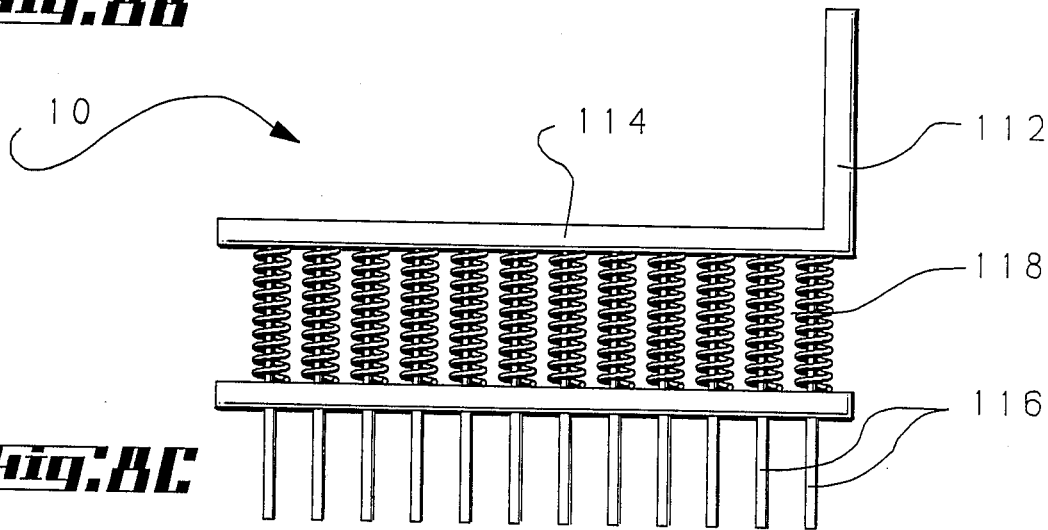

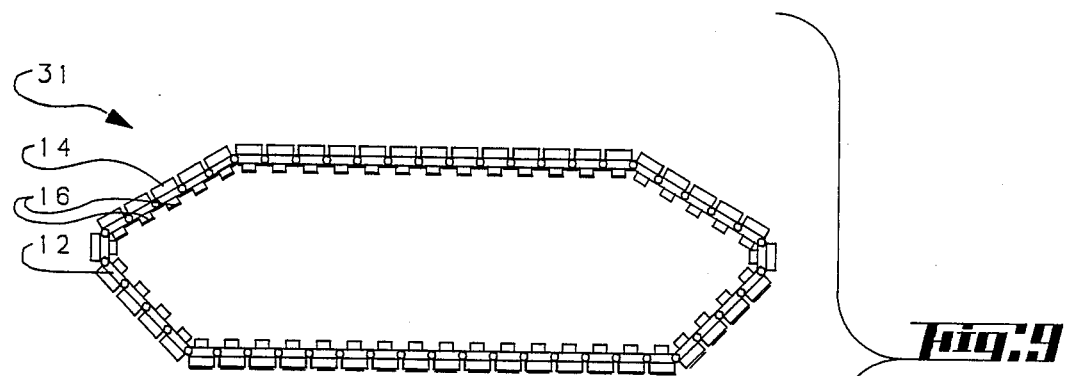
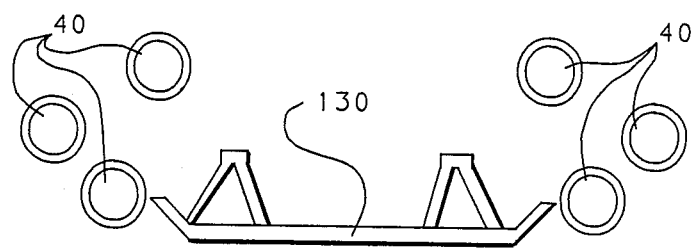
Fig. 9
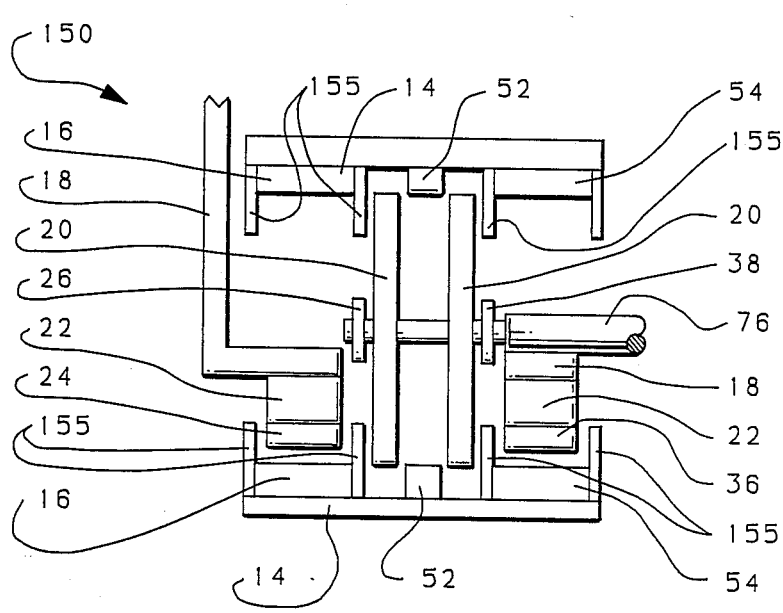
Fig. 10

ELECTROMAGNETIC LEVITATION DEVICE FOR WHEELED-VEHICLES

BACKGROUND OF THE INVENTION

This invention is related to wheeled-vehicles which move over waterless surfaces, including tracks, roads, etc. More particularly, this invention relates to a means, i.e., an electromagnetic device, for reducing the energy necessary to move a wheeled-vehicle, as well as suspending and transferring the wheeled-vehicle's weight from its axles to the electromagnetic device.

In the operation of all vehicles, there is a need to reduce the wear and tear on them, as well as the cost of their operation. For example, in the operation of trucks (particularly trailer trucks) and automobiles, there are substantial costs in their maintenance and upkeep, as well as yearly road repairs. This is also true for railroad cars and locomotives where there are always repair, maintenance and upkeep costs of the cars and locomotives, as well as the costs for the upkeep of the tracks, track beds and rails.

Also, overall, there is a need to reduce, or at least lessen, the energy costs for operation of the vehicles. The cost for running the vehicles keeps on rising with cost of energy, i.e., fuel, coal and the like. In this respect, there is a need to reduce the amount of energy necessary for the operation of the vehicles, and thus its cost.

There have not been any attempts of note to reduce the cost of operating vehicles or for reducing the cost of maintaining the roadways, railroad tracks, and the like.

There have, however, been magnet means used in the operation of vehicles, For example, electromagnetic means, i.e., devices have been utilized to attract and repel metal surfaces of all kinds. These electromagnetic devices have been used to attract the wheels of a vehicle to the tracks over which the vehicle may be driven or propelled. In fact, such magnetic devices have been used on railway cars which are driven over and along an inclined track. In such case, the electromagnetic devices are strong enough to adhere the vehicle wheels to the surface of the tracks over which the vehicle is driven. The use of such electromagnets in this manner is quite expensive and not practical. The electromagnets are not able to be used to reduce the amount of energy necessary to move or drive a wheeled-vehicle and certainly the electromagnets have not been used to suspend or transfer the weight of the vehicle while moving over a surface and reduce the wear and tear, and eventually the life of a wheeled-vehicle.

Electromagnets have also been used in the operation of wheelless vehicles, such as those described in U.S. Pat. Nos. 3,791,309 and 3,951,074. In these cases, however, a special track or railroad had to be provided to accommodate the wheelless vehicles. The cost of such tracks and railway beds would be prohibitive in our present railway operation and such wheelless railway cars could not be adapted to our present track system.

Thus, it is an object of the present invention to provide a means for both transferring and suspending the weight of a wheeled-vehicle, as well as for moving it over a surface with a minimum of energy necessary for operation of the wheeled-vehicle.

And, overall, it is an object of the present invention to provide a means, i.e., an electromagnetic device, to reduce the operation and maintenance cost of vehicles, as well as reducing the energy power necessary for their operation because the vehicle is generating electric power during its operation.

DISCLOSURE STATEMENT

U.S. Pat. No. 714,851 discloses a railway cars which use a magnetic means to reduce the friction incident to the movement of the cars along the tracks.

U.S. Pat. No. 3,682,265 discloses a magnet vehicle supportedly adhered to and adapted to run over an inclined wall surface of a structural member made of strong magnetic material.

U.S. Pat. No. 3,927,735 discloses a magnetic system for the contactless guidance of a vehicle moving along a track with a plurality of individual magnets on the vehicle disposed one behind the other in the travel direction of the vehicle.

U.S. Pat. No. 3,960,229 discloses a motor-driven vehicle moveable by a chain belt which is carrying a series of electromagnetic pads. The pads, when energized, cause a strong electromagnetic force to be generated, enabling the vehicle to adhere to an inclined steel surface, such as a ship.

SUMMARY OF THE INVENTION

This invention provides an electromagnetic device for levitating and moving a wheeled-vehicle over a waterless surface at a substantial reduction of energy and cost to operate the wheeled-vehicle. The electromagnetic device comprises:

(a) an endless link-belt arranged to contact the surface over which said vehicle is moved;

(b) a first and second series of magnets positioned on the inner surface of said link-belt and arranged to simultaneously repel a third series of magnets suspended from the body of said vehicle, and a fourth series of magnets suspended from the axles of said vehicle;

(c) a wheel track arranged in between the first and second series of magnets, positioned on the inner surface of said belt;

(d) a set of metal wheels positioned on the axles of said vehicle and arranged to engage said wheel track to move said belt by rotation of said wheels; and (e) a set of electric harnesses each having a fixed edge-grooved metal bar attached to said wheels and an electric wire harness rotating in said edge-groove in coordination with the moving belt, each of said electric harnesses being arranged to conduct electrical energy from the vehicle power source to said magnet series positioned on the inner surface of said belt, whereby when said series of magnets suspended from the vehicle body and axles are engaged, the series of magnets arranged on the inner surface of said belt are also energized to repel said suspended magnets, thereby transferring the vehicle weight from the axle to said endless belt to suspend the vehicle and reduce the energy necessary to move said vehicle.

BRIEF DESCRIPTION OF DRAWINGS

The advantages and other objects of the present invention will be apparent when considering the drawings in conjunction with the detailed description of the present invention provided below. The drawings are:

FIG. 4A is a partial sectional view of the single-wheeled track unit of FIG. 1;

FIG. 4B is a partial sectional view of the double-wheeled track unit of FIG. 2;

FIG. 5 is a side view of the electric wire harness to charge the magnets on the endless belt of the electromagnetic device shown in FIGS. 1 and 2;

FIG. 6 is a partial rear view of the double-wheeled track unit of FIG. 2;

FIG. 8A is a partial rear view of the electronic means for operation of retractable studs within the eletromagnetic device of FIGS. 1 and 2;

FIG. 8B shows the depressing bar arrangement of the electronic means of FIG. 8A;

FIG. 8C illustrates the retractable studs of the electronic means of FIG. 8A, in their projected position;

FIG. 9 is a side view of a single track unit having a runner incorporated therein according to the present invention; and FIG. 10 is a rear elevational view of the electromagnetic means arranged with the endless belt of FIGS. 1 and 2.

DETAILED DESCRIPTION OF THE INVENTION

Figure 1:
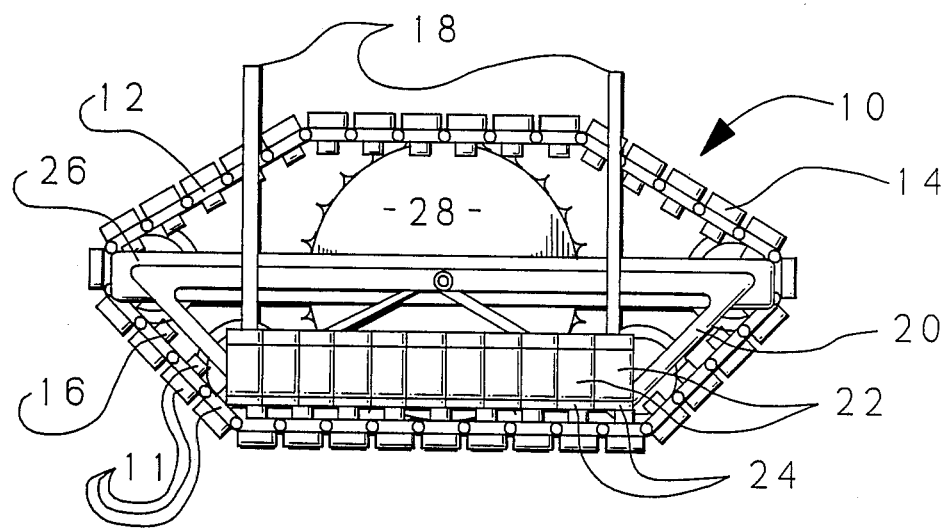
FIG. 1 is an elevational view of an assembled electromagnetic single-wheeled track unit device of the present invention.

In describing the present electromagnetic device, all components illustrated in the drawings are described as to purpose and function in the operation of the present electromagnetic device. Any components not shown in the drawings will be indicated as such.

As discussed above, the present electromagnetic device is specifically designed and arranged to transfer and suspend the weight of wheeled-vehicles, as well as substantially reduce the energy and costs for operating the vehicles.

Figure 2:
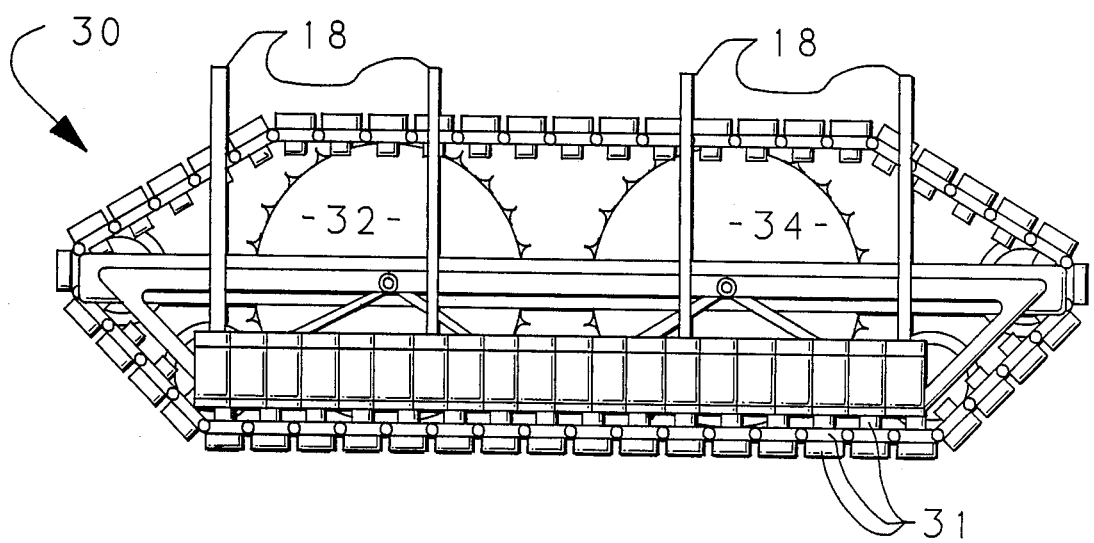
FIG. 2 is an elevational view of an assembled electromagnetic double-wheeled track unit device of the present invention.

Referring to FIGS. 1 and 2, electromagnetic devices (10) and (30) are illustrated, which devices (10, 30) may be used on any wheeled-vehicle that travels over any waterless surface, e.g., desert, roads, railroad tracks, highways, etc.

As shown in FIG. 1, the device (10) is made up of an endless link-belt (12) which has rubber pads (14) on the outer surface (15) and a first series of magnets (16) on the inner surface (17). A drive wheel (28) is positioned and engaged on the inner surface (17) of the endless link-belt (12).

Figure 3:
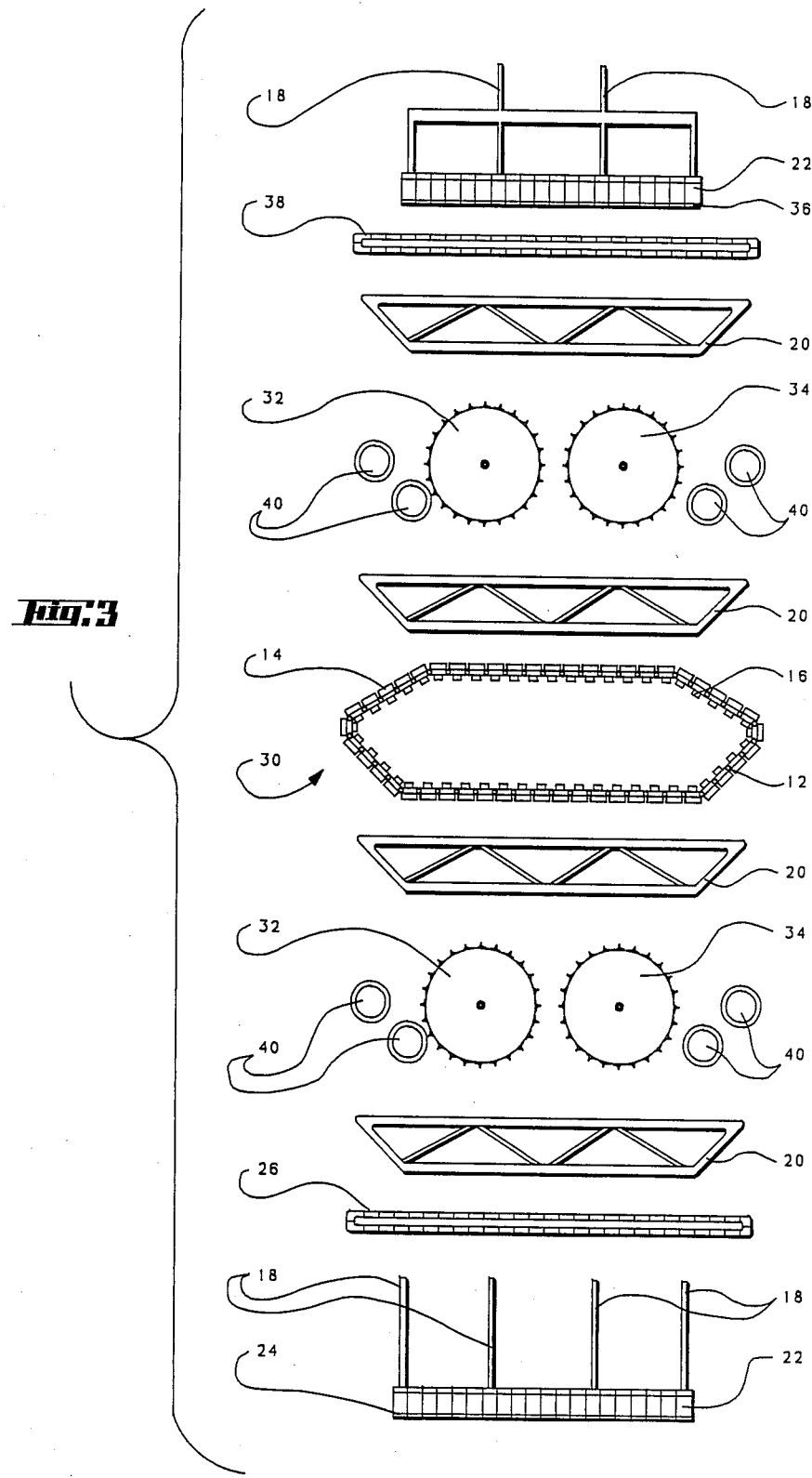
FIG. 3 shows the separate parts of the double-wheeled track unit of FIG. 2.

The link-belt's (12) path is directed around belt-forming wheels (40), as shown in FIG. 3. The magnets (16) are energized by power generated through an electric harness (26), which is electrically connected with the power source (not shown) of the vehicle.

Similarly, as shown in FIG. 6, a second series of magnets (54) are energized by power generated through the electric harness (27) which is connected with the vehicle's power source (not shown). In addition, as shown in FIG. 6, a third (24) and fourth (36) series of magnets are provided, which magnets (24) and (36) are energized through electric wires from the vehicle's power source through attachment bars (18).

As can be understood, the electromagnetic device (10) is arranged to travel in a horizontal manner over surfaces which are generally flat, but may move over inclined surfaces and tracks as described below. That is, a vehicle having the present electromagnetic device is able to move any distance without any restriction of the surface over which it is moved.

As shown in FIG. 1, the single-wheeled track unit (10) includes vehicle attachment bars (18) which is attaching rubber shock absorbers (22) and the third series of magnets (24) to the vehicle body. Also, wheel frames (20) are provided to enclose the drive wheel (28) and belt-forming wheels (40) of the electromagnetic device (10).

Referring to FIG. 2, a double-wheeled electromagnetic track unit (30) is shown. This unit (30) includes two drive wheels (32) and (34) along with belt-forming wheels (40) as shown in FIG. 3. As in the single-wheeled track unit (10) of FIG. 1, the double-wheeled track unit (30) includes the endless belt (12), the rubber pads (14), the first series of magnets, (16), the third series of magnets (24), the attachment bars (18), the wheel frames (20), the shock absorbers (22), and the electric harness (26).

As in FIG. 1, the second series of magnets (54) and the fourth series of magnets (36) are not shown in FIG. 2, but are illustrated in FIG. 3. Also, there is a track unit enclosure (not shown) for both the single-wheeled (10) and double-wheeled (30) track units.

The various separated components of the electromagnetic device (30) are shown in detail in FIG. 3.

In FIG. 3, there is shown from the top the two halves of the unit (30) positioned in the middle of FIG. 3. When the various components are assembled, they are as illustrated in FIG. 2.

Referring specifically to FIG. 3, from the top, there are shown the attachment bar (18), shock absorbers (22), the fourth series of magnets (36), inner electric wire harness (27), the wheel frame (20), drive wheels (32) and (34), belt-forming wheels (40), wheel frame (20), belt-forming wheels (40), wheel frame (20), the endless link-belt (12), rubber pads (14), the first series of magnets (16), wheel frame (20), drive wheels (32) and (34), belt-forming wheels (40), wheel frame (20), outer electric wire harness (26), third series of magnets (24), shock absorbers (22), and attachment bar (18).

In FIG. 3, and as illustrated in FIGS. 1 and 2, the various wheels used in the electromagnetic device (30) includes the drive wheels (32) and (34) which engage the endless link-belt (12) to move the vehicle. Also, the belt-forming wheels (40) are shown which form the path that the link-belt (12) moves. Moreover, the wheel frame (20) is provided to maintain the wheels' position during the movement of the vehicle.

FIG. 4A illustrates the top inside view of a single-wheeled track unit arrangement of the electromagnetic device (10) which has a single drive track (52) the first series of magnets (16) arranged on one side of the single drive track (52), and the second series of magnets (54) on the other side.

In like manner, FIG. 4B illustrates the top inside view of a double-wheeled track unit arrangement of electromagnetic device (30) which has two drive tracks (61) and (62), where the first series of magnets (16) are positioned on one side of the respective drive tracks (61)

and (62), and the second series of magnets (54) on the other side.

The electric harness (26) is illustrated in FIG. 5, and electric harness (27) not shown, are the means through which electric energy is provided for the first (16) and second (54) series of magnets (not shown). This electric energy is transmitted through coiled electrical wires (72) to each of the series of magnets (16) and (54). The harnesses (26) and (27) are positioned on both sides of the wheel frames (20). To each of the harnesses (26) and (27) there are metal harness bars (70) is attached by attachment bars (74).

In the metal bars (70) of each harness (26) and (27), there is a fixed edged-groove in which an electric wire harness rotates in coordination with the moving link-belt (12). Each of the electric harnesses (26) and (27) are arranged to conduct electrical energy from the vehicle power source (not shown) to the first (16) and second (54) magnet series positioned on the inner surface of the link-belt (12). Thus, when the third (24) and fourth (36) series of magnets suspended, respectively, from the vehicle body and axles are engaged, the first (16) and second (54) series of magnets arranged on the inner surface of the link-belt (12) are also energized to repel the suspended third (24) and fourth (36) series of magnets, whereby the vehicle weight is transferred from the axle to the link-belt (12) to suspend the vehicle and reduce the energy necessary to move the vehicle.

FIG. 6 shows a sectional view of the electromagnetic device (30) as used in a truck or automo- bile. As shown, the drive wheels (32) and (34) are positioned in drive tracks (61) and (62) which are surrounded by wheel guards (63) and (64). The link-belt (12) has the first series of magnets (16) which interact with the third series of magnets (24), and has a second series of magnets (54) which interact with the fourth series of magnets (36). The magnets (24) and (36) are suspended, respectively, from the vehicle body (75) and axle (76). This is the means of transferring the vehicle's weight from the axle (76) to the link-belt (12).

Figure 7A:
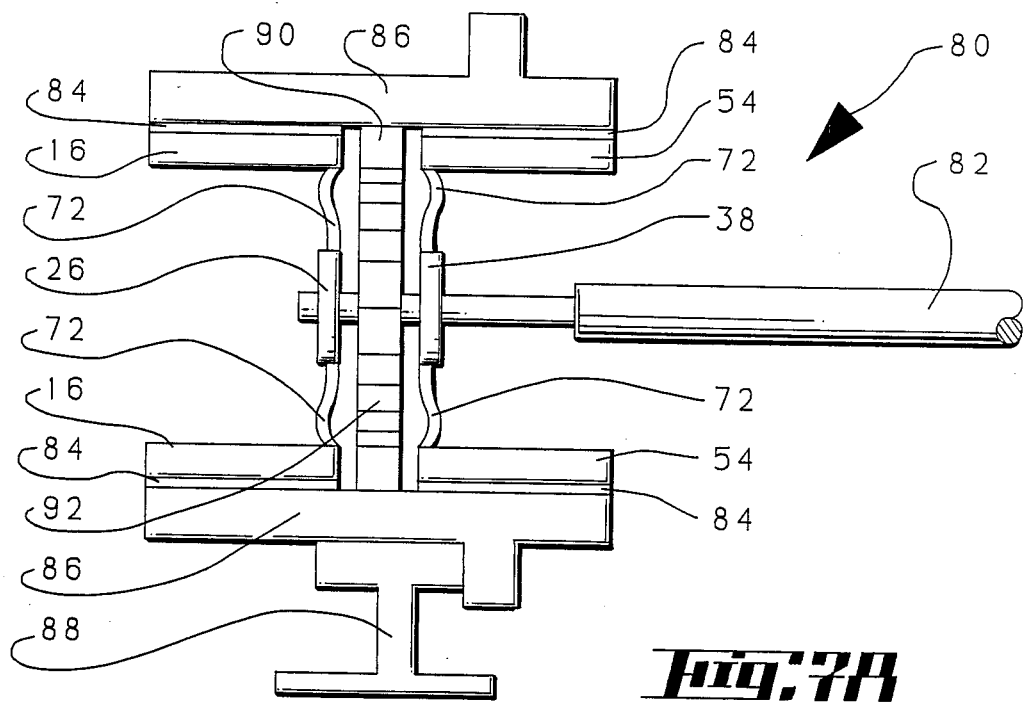
FIG. 7A is a partial rear view of a railroad track unit according to the present invention.

Referring to FIG. 7A, a partial rear view of a railroad track unit (80) in arrangement with the present electromagnetic unit (10). As shown, the railroad track unit (80) includes a solid steel belt (86) which serves as the core of the unit (80). Also, the track unit (80) includes a magnetic de-sensitizer layer (84) to prevent magnetism entering the steel belt (86) from the first series (16) and second series (54) of magnets. A drive wheel (92) is provided for movement of the track unit (80) on rail (88). Axle (82) extends through the drive wheel (92) which electric harnesses (26) and (27) and harness coils (72) through which the electric energy is transmitted to the first series (16) and second series (54) of magnets.

The other components, for the purpose of clarity, of the unit (80) are not shown as illustrated for electromagnetic devices (10) and (30) shown in FIGS. 1, 2 and 3.

Figure 7B:
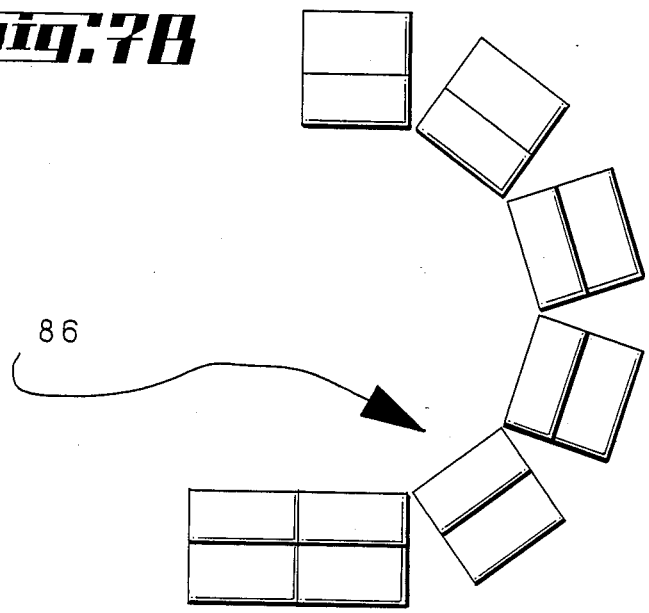
FIG. 7B is a partial side view of the railroad tack unit shown in FIG. 7A.

FIG. 7B illustrates a portion of the flexible steel belt (86).

Referring to FIGS. 8A, 8B, and 8C, there is shown a mechanism, i.e., a bar attachment unit (100) for traction studs (116) for projecting and retracting the studs (116) in the rubber pads (14) of the single-wheeled (10) and double-wheeled (30) track units, shown in FIGS. 1 and 2.

The bar adjustment unit (100) is arranged (as shown in FIG. 8A) on the outside of the wheel frames (20) to contact the stud pins (112) to project and retract the studs (116) when needed.

The bar adjustment unit (100) shown in detail in FIG. 8B includes a portion of the wheel frame (20), guiding rods (102), motors (104), and adjustment bar (106).

When necessary, e.g., in winter weather, the vehicle operator energizes the motors (104) positioned on the adjustment bar (106) to lower the bar (106) to depress the stud pin (112) whereby the studs (116) are uniformly projected by stud plate (114) through the rubber pads (14). This lowering or raising of the bar (106) on the guide bars (102) may have the effect of a rack and pinion arrangement.

As shown in FIG. 8C, springs (118) are arranged around the studs (116) to retract them when not in use. The springs (118) are each enclosed in a housing (not shown).

In all vehicles, there are at least one set of drive wheels, e.g., wheels (32) and (34), and there may be four or more sets on a trailer truck or railroad car.

Referring to FIG. 9, the core-link-belt unit (31) is shown which includes the core-link-belt (12) that has rubber pads (14) on its outer surface and the first series of magnets (16) on its inner surface. In this arrangement, runners (130) are substituted for one set of drive wheels (32) and (34) shown in FIG. 2. These runners (130) are arranged within the endless belt (12) to provide stability of the vehicle operation. Belt-forming wheels (40) are provided as in unit (30) of FIG. 2 to form the path of the core-link-belt (12).

In FIG. 10, there is a partial rear view of an electromagnetic track unit device (150) which has a fully magnetic means for its operation. This track unit device (150) is similar to the single-wheeled unit (10) shown in FIG. 1 in arrangement, but does not have the drive wheel (28) of unit (10) or the runners (130) of FIG. 9. That is, the electromagnetic track unit device (150) is arranged within the endless link-belt (12) in a manner to replace the drive wheel (28) or drive wheels (32) and (34) of FIG. 2 and the runners (130) of FIG. 9. And, the track unit device (150) functions as a propelling and braking system for the overall electromagnetic device (10) of FIG. 1 and device (30) of FIG. 2. In order to secure the vehicle within the track unit device (150), guard rails (155) are provided on the outsides of the first series of magnets (16) and the second series of magnets (54).

In the fully magnetic device (150) shown in FIG. 10, there is provided similar to the device (10) of FIG. 1, rubber pads (14), the outside harness (26), the first series of magnets (16), the third series of magnets (24), shock absorbers (22), wheel frame (20) and the vehicle attachment bar (18). Also shown in FIG. 10, but not in unit (10) of FIG. 1 are vehicle axle (76), inside harness (27), second series of magnets (54), fourth series of magnets (36) and the single-wheeled drive track (52).

According to the present invention, the electromagnetic device of FIG. 1 (10), FIG. 2 (30), and FIG. 10 (150) may be arranged in combination to include the drive wheels (28, 32 and 34), the runners (130) and electromagnetic track device (150) in separate link-belts (12) on the same vehicle.

The present electromagnetic levitating devices (10) and (30) provide advantages for several groups, including governments, railroads, car and truck owners, insurance companies and airline companies. These advantages are set forth below in Table I.

TABLE I
ADVANTAGES-SAVINGS

A. Governments

1. Less road damage because weight is distributed over a longer contact base.
2. Lesser claims against governments due to accidents caused by potholes, poor road conditions.
3. Reduction of trade deficit due to fuel savings caused by using smaller engines.
4. Longer life of government-owned vehicles.
5. Eliminating loss of life and bodily harm to people, thereby increasing manpower and higher use of funds expended on education.
6. Cost savings and extending use of garbage dumps by eliminating dumping of tires.

B. Railroads

1. Reducing wear on roadbeds, because of weight distribution, thereby saving on repair costs and also funds for railroad ties by using wider spacing.
2. Reducing cost for locomotives by using smaller and lighter engines.
3. Reducing costs for locomotives by using only one engine instead of three or four.
4. Eliminating damage and damage claims caused by bumping cars against cars (assembling, stopping and starting).
5. Reduced rates and/or more profit.

TABLE I (continued)
ADVANTAGES-SAVINGS

C. Automobile and Truck Owners

1. Tires are eliminated/only pads are being used.
2. No more tire repairs and retreads.
3. Balancing tires.
4. Change from winter to summer tires.
5. Increased safety:
   (a) By eliminating tire blowouts
   (b) Shorter braking distances
   (c) Better traction in winter driving
   (d) Eliminating repairs or replacements of broken parts due to obstacles, poor road conditions or potholes:
      (aa) Broken or cut tires
      (bb) Damaged rims
      (cc) Damaged or broken axles
      (dd) Front end
   (e) Eliminating accidents due to above road conditions.
6. Reducing threat to life and bodily harm.
7. Lost wages due to lost life or injuries.
8. Savings by extending life of vehicle.
9. Savings due to reduced insurance rates.

TABLE I (continued)
ADVANTAGES-SAVINGS

C. Automobile and Truck Owners (continued)

10. Savings on gasoline/diesel fuel due to higher mileage per gallon.
11. No cost for spare tire.
12. Longer life of ball bearings.
13. Eliminating cost for loaner while vehicle is being repaired.

D. Insurance Companies

1. Reduced claims for property damage (automobiles/trucks).
2. Reduced airplane damage and loss.
3. Reduced life and injury claims.

E. Airline Companies

1. Tire blowouts.
2. Lost or damaged equipment for airplanes.
3. Lost revenue due to repair.
4. Lower insurance rates.
5. Savings by eliminating tires.

Although the present invention may be modified by those skilled in the art, the present invention includes only that defined by the appended claims.

I claim:

1. An electromagnetic device which levitates and moves a wheeled-vehicle over a surface, comprising:
   (a) an endless link-belt arranged to contact the surface over which said vehicle is moved;
   (b) a first and second series of magnets positioned on the inner surface of said link-belt and arranged to simultaneously repel a third series of magnets suspended from the body of said vehicle, and a fourth series of magnets suspended from the axles of said vehicle;
   (c) a wheel track arranged in between the first and second series of magnets, positioned on the inner surface of said belt;
   (d) a minimum of one set of metal drive wheels positioned on the axles of said vehicle and arranged to engage said wheel track to move said belt by rotation of said wheels; and
   (e) a set of electric harnesses each having a fixed edged-grooved metal bar attached to said wheels and an electric wire harness rotating in said edge-groove in coordination with the moving belt, each of said electric harnesses being arranged to conduct electrical energy from the vehicle power source to said magnet series positioned on the inner surface of said belt, whereby when said series of magnets suspended from the vehicle body and axles of said wheels are engaged, the series of magnets arranged on the inner surface of said belt are also energized to repel said suspended magnets, thereby transferring the vehicle weight from the axle to said endless belt to suspend the wheeled-vehicle and reduce the energy necessary to move said vehicle.

2. The electromagnetic device of claim 1, wherein said surface is a waterless surface.

3. The electromagnetic device of claim 1, wherein said series of magnets are electromagnets.

4. The electromagnetic device of claim 1, wherein the set of metal wheels are drive wheels.

5. The electromagnetic device of claim 1, wherein the wheel track has a guard to maintain the wheels in position.

6. The electromagnetic device of claim 1, wherein said link-belt has a series of pads on the outer surface thereof.

7. The electromagnetic device of claim 6, wherein there is arranged a mechanism for projecting and retracting traction studs within the pads thereof.

8. The electromagnetic device of claim 1, wherein a wheel frame is provided to maintain the wheels on their axles.

9. The electromagnetic device of claim 1, wherein the vehicle weight transferring means is contained wholly within said device.

10. The electromagnetic device of claim 1, wherein the vehicle is able to move any distance without any restriction of the surface over which it is moved.

11. The electromagnetic device of claim 1, wherein runners are substituted for one set of said metal drive wheels, said runners being arranged within said endless belt to provide stability of the vehicle operation.

12. The electromagnetic device of claim 11, wherein an electromagnetic track unit device is arranged within said endless link-belt in a manner to replace the drive wheels and runners.

13. The electromagnetic device of claim 12, wherein the electromagnetic device functions as a propelling and braking system.

* * * * *